United States Patent

[11] 3,629,645

[72] Inventor Thomas Lester Taylor
Batavia, N.Y.
[21] Appl. No. 851,191
[22] Filed Aug. 19, 1969
[45] Patented Dec. 21, 1971
[73] Assignee Sylvania Electric Products Inc.

[54] TELEVISION RECEIVER PROTECTIVE SYSTEM FOR PREVENTING SCREEN BURN

9 Claims, 1 Drawing Fig.

[52] U.S. Cl. .......... 315/20
[51] Int. Cl. .......... H01j 29/52
[50] Field of Search .......... 315/20

[56] References Cited

UNITED STATES PATENTS 3,112,425 11/1963 Theisen .......... 315/20

FOREIGN PATENTS 945,145 12/1963 England .......... 315/20
968,719 9/1964 England .......... 315/20

*Primary Examiner*—Rodney D. Bennett, Jr.
*Assistant Examiner*—Brian L. Ribando
*Attorneys*—Norman J. O'Malley, Donald R. Castle, Thomas H. Buffton and Edward J. Coleman

ABSTRACT: In a television receiver in which a television signal source is DC coupled to the cathode of a picture tube and circuit means including a brightness control is connected between the control grid of the picture tube and a power supply, a protective system for preventing screen burn comprising a diode with parallel capacitor connected between the variable tap of the brightness control and ground, the diode being rendered conducting in response to applied horizontal blanking pulses. Upon cessation of blanking pulses from a threshold controlled source, the brightness control tap is disconnected from ground, thereby causing the control grid voltage to increase and thus increase the beam current to discharge the high voltage stored on the picture tube before scan collapse.

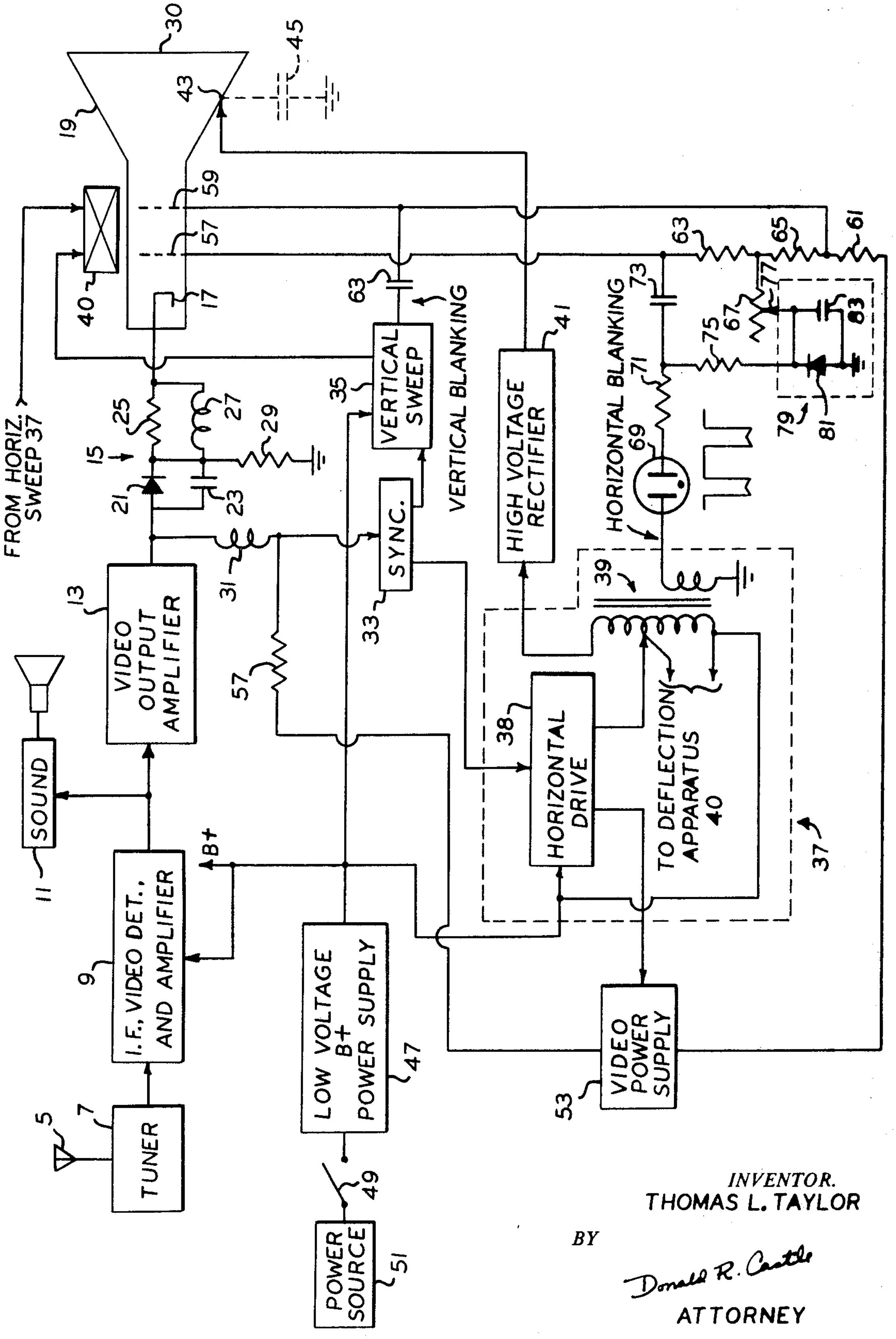
INVENTOR.
THOMAS L. TAYLOR
BY
Donald R. Castle
ATTORNEY

TELEVISION RECEIVER PROTECTIVE SYSTEM FOR PREVENTING SCREEN BURN

BACKGROUND OF THE INVENTION

This invention relates to a protection system for electronic apparatus and, more particularly, to protection systems employing voltage-responsive switching means.

In electric apparatus employing multiple interdependent power supplies utilizing a single power source as a means of energization, it has been customary merely to provide a switch for connecting and disconnecting the power source. While such systems are perfectly adequate for many types of apparatus, it has been found that numerous other types of electrical apparatus require special protective circuitry to prevent the retention of undesired high potentials which can result in permanent damage to the apparatus.

More specifically, one particular form of apparatus which employs multiple interdependent power supplies is a television receiver. Television receivers include at least a low-voltage B+ power supply for energizing most of the receiving and scanning circuitry and a high-voltage power supply for providing accelerating energy to the second anode of the picture tube. The high-voltage power supply includes a filter capacitor which is usually provided by the internal and external aquadag coatings on the picture tube, with the glass wall therebetween acting as the dielectric. The beam current in the picture tube is controlled by the relative potentials on its cathode and control grid electrodes, the cathode of the picture tube being coupled to the video signal source in the receiver. If, upon turning off the receiver, the potentials on the cathode and control grid of the picture tube vary in a manner causing the beam current to be cut off before dissipation of the stored charge on the picture tube (i.e. the high-voltage filter capacitor), electrons from the cathode will continue to be accelerated toward the phosphor-coated picture tube face well after decay of the scanning system. As a result, a stationary bright spot will persist on the picture tube face, after disconnection of the power source, until the high voltage on the picture tube is discharged as a result of eventual dissipation of the potential on the picture tube cathode and grid. After repeated occurrences of this undesired retention of stored high-voltage accelerating energy, the intolerable result is a burned and permanently damaged spot at the center of the viewing screen.

In television receivers in which the picture tube is AC coupled to the video signal source, the problem of beam current cutoff prior to dissipation of the stored charge of the picture tube does not arise because the AC coupling capacitor blocks the DC component of the video signal from the picture tube. Thus, the cathode of the picture tube is coupled to a potential reference level such as circuit ground, and beam current is maintained long enough to discharge the high voltage stored on the picture tube prior to scan collapse.

It has been found, however, that television receivers entirely dependent on AC coupling of the signal source to the picture tube leave much to be desired with respect to a true rendition of the scene viewed by the television camera. By removing the DC component, the black level is not maintained at the picture tube cutoff level but rather at a level which tends to shift in accordance with the average video signal value which is dependent upon the scene viewed by the camera. Accordingly, in the design of television receivers it is preferable to include a DC coupling between the video source and picture tube in order to more faithfully reproduce the light values viewed by the television camera.

The use of a DC coupling between the video output stage and picture tube of a vacuum tube receiver may or may not result in burn spot problems, depending upon the relative time constants in the receiver circuits determinative of the potentials on the cathode and control grid of the picture tube. The problem is more clearly seen in transistorized television receivers which employ a very low voltage power supply for energizing most of the transistor circuitry, including the video drive circuits and the vertical and horizontal sweep circuits, and a higher voltage power supply for a video output transistor amplifier which is DC coupled to the picture tube. When the transistorized receiver is turned off, thereby disconnecting the low-voltage power supply from the power source, most of the receiver components including the video drive circuits and horizontal and vertical sweep circuits are rapidly rendered inoperative. The resulting discontinuance of the video signal will cause the video output transistor to be cut off, whereupon the collector of the video output transistor will rapidly rise to the potential of the video power supply. Further, the video power supply normally includes a relatively large filter capacitor which will tend to maintain this undesirable and relatively high potential at the video output. As this high video supply potential is also DC coupled to the cathode of the picture tube, the resulting rise in cathode potential will cut off beam current prior to discharge of the stored high voltage on the picture tube. The coupling circuitry between the video output and the picture tube cathode will permit a slow discharge of the cathode potential and, thus, eventual beam current flow to discharge the accelerating energy, but not until long after decay of the scanning system and persistence of a bright spot in the center of the viewing screen.

One known approach for overcoming the above-mentioned problem is the provision of a dual line switch wherein one section is utilized to disconnect the low voltage supply from the power source and a second section of the switch disconnects the higher voltage video power supply from the video output amplifier stage, thereby preventing the previously discussed increased potential from reaching the cathode of the picture tube. As a result, beam current will be maintained so as to discharge the stored high voltage on the picture tube prior to collapse of beam scanning, thereby preventing the formation of a long persisting bright spot at the center of the viewing screen. This approach is not foolproof, however, as the protective system provided by the second section of the dual switch is dependent upon actuation of the switch to the "off" position. Hence, any interruption of the power available at the source, other than activation of the switch, such as by disconnecting the line cord, renders the dual switching protective system ineffective since the second section of the dual switch is not actuated and the video power supply is not disconnected from the cathode of the picture tube.

Another prior art method for providing screen burn protection is described by U.S. Pat. No. 3,402,316, issued Sept. 17, 1968, and assigned to the assignee of the present application. A magnetic flux responsive switch is connected between the video power supply and the video output stage, and disposed in flux-linking relationship to an inductive filter in the low-voltage power supply. Upon interruption of the power applied to the low-voltage power supply, the flux linkage rapidly collapses, thereby promptly disconnecting the video power supply from the video output circuit and preventing any rise in picture tube cathode potential. Although the flux switch technique is quite effective in a number of receiver applications, its speed of response may be too slow to prevent screen burn in cases where the low-voltage power supply has a slow decay characteristic. For example, recent low-cost-type television receivers employ as the low-voltage power supply an off-the-line half-wave rectifier having large filter capacitors. In such a case it has been found that the slow discharge characteristic of the low-voltage power supply delays flux linkage collapse, and thus the opening of the flux switch, beyond collapse of beam scanning, thereby resulting in screen burn.

Yet another prior art approach is to connect the supply voltage for the screen, or accelerating grid of the picture tube, through a very high resistance bypassed to ground by a capacitor. Upon disconnection of the receiver power source, the large resistance will cause the bypass capacitor to discharge very slowly thereby maintaining the potential on the screen grid to prevent cutoff of the picture tube beam current before discharge of the high-voltage filter capacitor. Although this approach is simple, it is quite limited in application as it cannot be used when the screen grid is connected in the usual manner to a low impedance vertical blanking pulse source, or when the screen grid voltage is varied with the brightness control.

SUMMARY OF THE INVENTION

With an awareness of the aforementioned disadvantages of the prior art, it is an object of the present invention to provide an improved and more effective protection system for electrical apparatus.

Another object of the invention is to provide a simplified and economical protection system for a television receiver which is automatically responsive to energy source means in the receiver.

In electrical apparatus employing a display device having a plurality of electrodes, a signal source DC coupled to a first one of the electrodes, electron beam deflection apparatus associated with the display device, power supply means input coupled to a power source and output coupled to energize said signal source and said deflection apparatus, and circuit means coupled intermediate said power supply means and a second one of the electrodes of said display device, these and other objects are achieved in one aspect of the invention by a switching means coupled between said circuit means and a potential reference level, and energy source means coupling said power supply means to said switching means to effect reversal of the operating state of said switching means prior to complete deenergization of the beam deflection apparatus upon decoupling of said power supply means from the power source.

BRIEF DESCRIPTION OF THE DRAWING

This invention will be more fully described hereinafter in conjunction with the accompanying drawing illustrating a television receiver employing one particular embodiment of the invention.

DESCRIPTION OF THE PREFERRED EMBODIMENT

For a better understanding of the present invention, together with other and further objects, advantages and capabilities thereof, reference is made to the following disclosure and appended claims in connection with the above-described drawing.

Referring to the drawing, the television receiver includes an antenna 5 for intercepting transmitted television signals and coupling these intercepted signals to a tuner 7 including the customary RF amplifier, mixer and oscillator. The output signal from the turner 7 is coupled to a video drive channel 9 wherein the IF signals are amplified and the video signal detected and amplified and applied to the usual sound channel 11 and a video output amplifier stage 13.

The video signals available from the output amplifier stage 13 are DC and AC coupled via a DC preservation network 15 to the cathode electrode 17 of a cathode-ray tube display device 19, more commonly referred to as a picture tube. More specifically, the DC coupling between the video output and picture tube cathode is provided by means of diode 21, and the AC coupling is provided via capacitor 23. The balance of preservation network 15 comprises a series resistor 25, a choke 27 connected across resistor 25, and a parallel resistor 29 connected between the common junction of the above-named components and ground.

Diode 21, of course, provides a DC coupling path only while it is in the conducting state. The purpose of using a diode for this function is to provide a means for opening the DC coupling circuit in response to a predetermined excessive current level, thereby preventing the undesired effects of blooming and defocusing on the viewing screen 30 of picture tube 19.

The video signals from the output amplifier 13 are also applied via choke 31 to a synchronizing channel 33 wherein the synchronizing pulses are separated from the video signals and applied to control the vertical and horizontal sweep circuitry, 35 and 37 respectively. In turn, the horizontal and vertical sweep circuits develop potentials suitable for application to electron beam deflection apparatus 40 associated with the picture tube 19 to cause both horizontal and vertical scanning of the viewing screen 30 by an electron beam. The horizontal sweep circuitry 37 includes a horizontal drive circuit 38 and a flyback transformer 39 having a tapped primary from which the deflection potentials are obtained.

The high-voltage power for the television receiver is obtained from the top of the primary winding of flyback transformer 39 and applied via high-voltage rectifier 41 to the second anode 43 of picture tube 19. Second anode 43 usually comprises an aquadag coating on the interior surface of the glass encased picture tube which is accessible by means of a button connector. The high-voltage potential present on the second anode provides the energy for accelerating the flow of electrons emitted from cathode 17 toward viewing screen 30. The high-voltage power supply also includes a filter capacitor 45 (shown in dashed lines) which is connected across the output of rectifier 41. Generally this capacitance exists between an external aquadag coating, which must be grounded, and the internal second anode aquadag coating, the glass wall of the picture tube acting as the dielectric.

The receiver also includes a low-voltage (B+) power supply 47 having an input which is coupled via an "on-off" switch 49 to a power source 51. Low-voltage power supply 47 operates in a well-known manner to provide relatively low B+ potentials for other stages of the receiver. In particular, the output of B+ supply 47 is shown coupled to the video drive channel 9 and the vertical and horizontal sweep circuitry, 35 and 37 respectively, to thereby energize the video signal source and electron beam deflection apparatus 40. The receiver further includes a video power supply 53 for providing a supply voltage to the video output amplifier 13 and the control circuitry of the picture tube grid electrodes which is somewhat higher than B+. Power supply 53 is energized by an output potential derived from the horizontal drive circuit 38, and one of the outputs of the video power supply is connected via resistor 57 and choke 31 to the output terminal of the video amplifier 13.

The illustrated circuitry is typical for a transformer-powered transistorized receiver incorporating the invention. In an off-the-line transistorized receiver, the supply voltages for the video output amplifier and the picture tube grid circuit would be obtained from B+ supply 47. In a typical vacuum tube receiver, there would be no separate video power supply; resistor 57 would be connected to B+; a B boost supply would be connected to resistor 61; and the horizontal sweep circuit would include a damper tube and have a different flyback transformer arrangement.

Picture tube 19 also includes a control grid 57 and a screen, or accelerating grid 59 for controlling beam current. Grid 59 is connected via resistor 61 to the video power supply 53, and vertical blanking pulses from the vertical sweep circuit 35 are applied to grid 59 via coupling capacitor 63.

Control grid 57 is coupled to video power supply 53 by means of a circuit comprising serially connected resistors 63, 65 and 61, and a brightness control potentiometer 67 branched out therefrom and having one terminal connected to the junction of resistors 63 and 65. As the video power supply 53 is coupled via horizontal drive circuit 38 to the low-voltage power supply 47, the circuit means comprising resistors 61, 63, 65 and 67 may be defined as coupled intermediate the low-voltage power supply 47 and control grid 57. A source of negative going horizontal blanking pulses is derived from a winding of the flyback transformer 39 and AC coupled to the control grid 57 through a serially connected circuit combination comprising neon bulb 69, resistor 71 and coupling capacitor 73. With respect to the horizontal blanking function, neon bulb 69 acts as a clipper to remove undesired sawtooth waveforms and ringing from the blanking signal. In addition, as described hereinafter, neon bulb 69 is selected to function as an energy source potential threshold means in accordance with the present invention.

Normally, a resistor 75 is connected between ground and the junction of resistor 71 and capacitor 73, and the variable tap 77 of potentiometer 67 is also connected to ground. In accordance with the present invention, however, these connections to ground, or other suitable potential reference level, are provided via a voltage-responsive switching circuit 79. This switching circuit 79 comprises a semiconductor diode 81 having its cathode electrode connected to one terminal of resistor 75 and the the variable tap 77 of brightness control potentiometer 67, and having its anode electrode connected to ground. Circuit 79 also includes a capacitor 83 connected across the cathode and anode electrodes of diode 81.

When low-voltage power supply 47 is connected to the power source 51 and the receiver is operating normally, the resulting energy generated by horizontal drive circuit 38 and applied to a tap of the flyback transformer 39 causes the generation of negative going horizontal blanking pulses from another winding of the flyback transformer. The DC coupling of these negative blanking pulses via neon bulb 69, resistor 71 and resistor 75 to the cathode of diode 81 will render that diode fully conducting. Capacitor 83 prevents the voltage across diode 81 from increasing positively during the horizontal trace period between blanking pulses. Consequently, the cathode of diode 81 and the variable tap 77 of the brightness control 67 are connected to ground, and the brightness control operates in its normal manner for adjusting the potential on the control grid 57. While the receiver is normally operating, therefore, flyback transformer 39, neon bulb 69 and resistors 71 and 75 function as an energy source means coupling low-voltage power supply 47 to switching circuit 79 to maintain diode 81 in the conducting state.

Before discussing the operation of switching circuit 79 upon decoupling low-voltage power supply 47 from power source 51, an assumed condition will be considered in which switching means 79 is not included in the receiver circuitry, thereby more clearly illustrating the desirable features of the present invention. Under this assumed undesirable condition, with resistor 75 and brightness control tap 77 connected to ground, an interruption in the power applied to low-voltage power supply 47 from the power source 51 will cause a relatively rapid dissipation of the scanning potentials applied to the vertical and horizontal deflection coils by the vertical and horizontal sweep circuits 35 and 37, respectively. As a result, an electron beam scanning the viewing screen 30 will assume a substantially fixed position at the center of the screen. Also, an interruption of the potentials available from low-voltage supply 47 will cause a discontinuance of the video signal normally applied to the video output amplifier 13. Assuming output amplifier 13 is a transistor, this removal of the video signal input will prevent or at least greatly inhibit current flow therethrough.

Because the path for current flow through the video amplifier 13 has been interrupted, the potential at the output terminal of amplifier 13 will rise to the full voltage output level of video power supply 53. Moreover, a relatively large filter capacitor in the video power supply will tend to maintain this undesirable and relatively high potential at the output terminal of video amplifier 13. As the inoperativeness of the video output stage 13 prevents rapid dissipation therethrough of the increased potential appearing at its output terminal, the only alternative discharge path is through diode 21 and resistor 29. For purposes of the DC preservation function, resistor 29 is normally selected to have a very high resistance value. Consequently, the high potential on the video amplifier 13 output terminal, which is also DC coupled to the cathode electrode 17 of picture tube 19, is very gradually dissipated by way of resistor 29. This maintenance of a high potential on cathode 17, relative to grid electrodes 57 and 59, is operative to cut off the beam current in picture tube 19 before the high-voltage filter capacitor 45 has been fully discharged. As a result, electrons emitted from cathode 17 continue to be accelerated by the high-voltage charge stored on capacitor 45 long after collapse of the scanning system. As a consequence, a nonscanning electron beam is directed at the center of the phosphor-coated viewing screen 30, causing a bright spot thereat, until the high potential on cathode 17 has been very slowly discharged through resistor 29. The obvious undesirable result is a burned and permanently damaged spot at the center of the viewing screen 30 of picture tube 19.

The above-described highly undesirable conditions are readily eliminated by the inclusion of the voltage-responsive switching circuit 79 in the following manner. When the receiver is switched off, or the application of power from source 51 to low-voltage power supply 47 is otherwise decoupled, horizontal sweep circuit 37 becomes deenergized, thereby causing the amplitude of the horizontal blanking pulses derived from flyback transformer 39 to decay. When the blanking pulse level drops below the firing point of neon bulb 69 (now functioning as a potential threshold means), this source of energy is abruptly extinguished, or deenergized. The resulting prolonged removal of negative voltage from the cathode of diode 81 allows capacitor 83 to charge in a positive direction toward the voltage level of the video power supply 53 through potentiometer 67 and resistors 65 and 61. Diode 81 then becomes reversed biased and thus nonconducting, thereby disconnecting the brightness control variable tap 77 from ground. With the negative blanking pulse source extinguished and the brightness control disconnected from ground, the bias voltages on grids 57 and 59 are permitted to increase in the positive direction and thereby increase the beam current flowing through picture tube 19. As the high-voltage power applied to second anode 43 via rectifier 41 is removed in response to the drop in horizontal sweep circuit output voltage, this increased beam current is operative to discharge the high voltage stored on filter capacitor 45. Further, since the switching circuit 79 is responsive to an energy source derived from one of the sweep circuits, selection of a neon bulb 69 having an appropriate firing point, or potential threshold level, will cause this increase in beam current and resulting discharge of stored accelerating energy to occur before the scan has collapsed, thereby preventing a stationary bright spot from forming on the viewing screen 30. In other words, flyback transformer 39 and neon bulb 69 provide a threshold controlled energy source means coupling low-voltage power supply 47 to switching circuit 79 to effect reversal of the operating state of diode 81 from conducting to nonconducting prior to complete deenergization of deflection apparatus 40 upon decoupling of power supply 47 from power source 51.

It is apparent from the foregoing description that the present invention provides an enhanced automatic protective system for electrical apparatus which is economical, simple, and readily adapted to existing apparatus. Further advantages obtained by use of the horizontal blanking pulses coupled through potential threshold means as the energy source to which the switching circuit 79 responds. In particular, the triggering of the switch is thereby caused to track with the scan system, a feature critical to the desired effect of this protective system, and the effectiveness of the switch is made independent of the type of low-voltage power supply employed or the filter capacitor sizes used therein. It is to be understood, however, that the invention is not limited to use in transistorized or vacuum tube television receivers having cathode-ray tube display devices, but may be employed as a protective system in other types of electrical apparatus having display devices. A properly biased diode may be used in lieu of neon bulb 69 as the potential threshold means. Further, it is contemplated that the energy source means for actuating switching circuit 79 may comprise any of the lower voltage power supplies in the television receiver in lieu of the horizontal blanking pulse source, provided the power supply, either due to its circuit characteristics or by use of a potential threshold means, extinguishes sufficiently prior to scan collapse to render the actuation of switching circuit 79 useful in preventing the formation of a stationary bright spot on viewing screen 30. Also in lieu of a diode, the semiconductor switching device may comprise a transistor having its control, or base, electrode connnected to the energy source and its other two electrodes connected to the brightness control tap 77 and ground, respectively.

Although the invention has been described with respect to certain specific embodiments, it will be appreciated that modifications and changes may be made by those skilled in the art without departing from the true spirit and scope of the invention.

I claim:

1. In electrical apparatus including a cathode-ray tube having a plurality of electrodes, a signal source DC coupled to a first one of said plurality of electrodes, electron beam deflection apparatus associated with said cathode-ray tube, power supply means having an input coupled to a power source and an output coupled to said signal source and said electron beam deflection apparatus for energizing said signal source and said electron beam deflection apparatus, and circuit means coupled intermediate said power supply means and a second one of said plurality of electrodes of said cathode-ray tube for energizing said second one of said plurality of electrodes, a protection system comprising:

switching means for coupling said circuit means to a potential reference level; and energy source means, including a potential threshold means for detecting a change in potential level upon decoupling of said power supply means from said power source, coupling said power supply means to said switching means for maintaining said switching means in a first operating state when said power supply means is coupled to said power source and for switching said switching means to a second operating state prior to complete deenergization of said beam deflection apparatus upon decoupling of said power supply means from said power source, said switching means and said circuit means cooperatively maintaining electron beam current in said cathode-ray tube during deenergization of said beam deflection apparatus.

2. The protection system of claim 1 wherein said switching means comprises a semiconductor device having a first electrode connected to said circuit means and a second electrode connected to said potential reference level, and a capacitor connected across the first and second electrodes of said semiconductor device.

3. The combination of claim 1 wherein said switching means comprises a diode having a first electrode connected to said circuit means and a second electrode connected to said potential reference level, and a capacitor connected across the first and second electrodes of said diode, said energy source means being coupled to the first electrode of said diode.

4. The protection system of claim 3 wherein said circuit means includes a potentiometer for controlling the potential on the second electrode of said cathode-ray tube, and said potentiometer has a variable tap connected to the first electrode of said diode.

5. The protection system of claim 3 wherein said protection system is employed in a television receiver, and said energy source means comprises a source of blanking pulses and said potential threshold means, said source of blanking pulses being coupled to the first terminal of said diode through said potential threshold means.

6. The protection system of claim 5 wherein said circuit means includes a brightness control potentiometer for adjusting the potential on the second electrode of said cathode-ray tube, and said potentiometer has a variable tap connected to the first electrode of said diode.

7. The protection system of claim 6 wherein said potential threshold means comprises a neon bulb serially connected between said source of blanking pulses and said diode.

8. The protection system of claim 7 wherein the first and second electrodes of said cathode-ray tube are the cathode and control grid, respectively, said source of blanking pulses derives the horizontal blanking pulses for said television receiver and is AC coupled to the control grid of said cathode-ray tube, said circuit means further includes a plurality of resistors serially connected between said control grid and means coupled to said power supply means, and said potentiometer has a terminal connected to the junction of two of said series resistors and is branched out therefrom.

9. The protection system of claim 8 wherein said circuit means further includes a second power supply coupled to said first mentioned power supply means, said plurality of resistors being serially connected between said control grid and said second power supply.

* * * * *